United States Patent [19]
Maus

[11] Patent Number: 5,839,273
[45] Date of Patent: Nov. 24, 1998

[54] METHOD FOR REDUCING POLLUTANT EMISSIONS OF A DIESEL ENGINE WITH A DOWNSTREAM OXIDATION-TYPE CATALYTIC CONVERTER

[75] Inventor: Wolfgang Maus, Bergisch Gladbach, Germany

[73] Assignee: Emitec Gesellschaft fuer Emissionstechnologie mbH, Lohmar, Germany

[21] Appl. No.: 656,414

[22] Filed: May 30, 1996

Related U.S. Application Data

[63] Continuation of PCT/EP94/03421 Oct. 17, 1994.

[30] Foreign Application Priority Data

Nov. 30, 1993 [DE] Germany .................. 43 40 742.0

[51] Int. Cl.⁶ .................................................. F01N 3/20
[52] U.S. Cl. .......................... 60/274; 60/284; 60/286; 60/297; 60/300
[58] Field of Search .............................. 60/300, 299, 284, 60/297, 286, 274

[56] References Cited

U.S. PATENT DOCUMENTS

| | | | |
|---|---|---|---|
| 2,674,521 | 4/1954 | Houdry | 60/301 |
| 4,685,290 | 8/1987 | Kamiya et al. | |
| 4,686,827 | 8/1987 | Wade | 60/297 |
| 4,979,364 | 12/1990 | Fleck | 60/275 |
| 5,146,743 | 9/1992 | Maus | 60/300 |
| 5,155,995 | 10/1992 | Kinnear | 60/300 |

FOREIGN PATENT DOCUMENTS

| | | |
|---|---|---|
| 0233860 | 8/1987 | European Pat. Off. . |
| 0412103 | 2/1991 | European Pat. Off. . |
| 2688029 | 9/1993 | France . |
| 8816514 | 12/1989 | Germany . |
| 3907939 | 8/1990 | Germany . |
| 3919343 | 12/1990 | Germany . |
| 4007516 | 9/1991 | Germany . |
| 678020 | 7/1991 | Switzerland . |
| 2134407 | 8/1984 | United Kingdom . |

OTHER PUBLICATIONS

Japanese Patent No. 5059929 (Hiromichi), dated Mar. 9, 1993.

"Erprobung von Partikelfiltern in Kundenfahrzeugen", MAN, Sep. 1987, pp. 1–3.

Primary Examiner—Douglas Hart
Attorney, Agent, or Firm—Herbert L. Lerner; Laurence A. Greenberg

[57] ABSTRACT

A method for reducing pollutant emissions from a Diesel engine, is performed during cold starting, partial load and/or idling. The Diesel engine has a downstream oxidation-type catalytic converter with freely penetrable channels and an inflow side having at least one electrically heatable portion. The electrically heatable portion is heated before and/or after starting of the Diesel engine to a temperature at which deposited soot ignites.

17 Claims, 1 Drawing Sheet

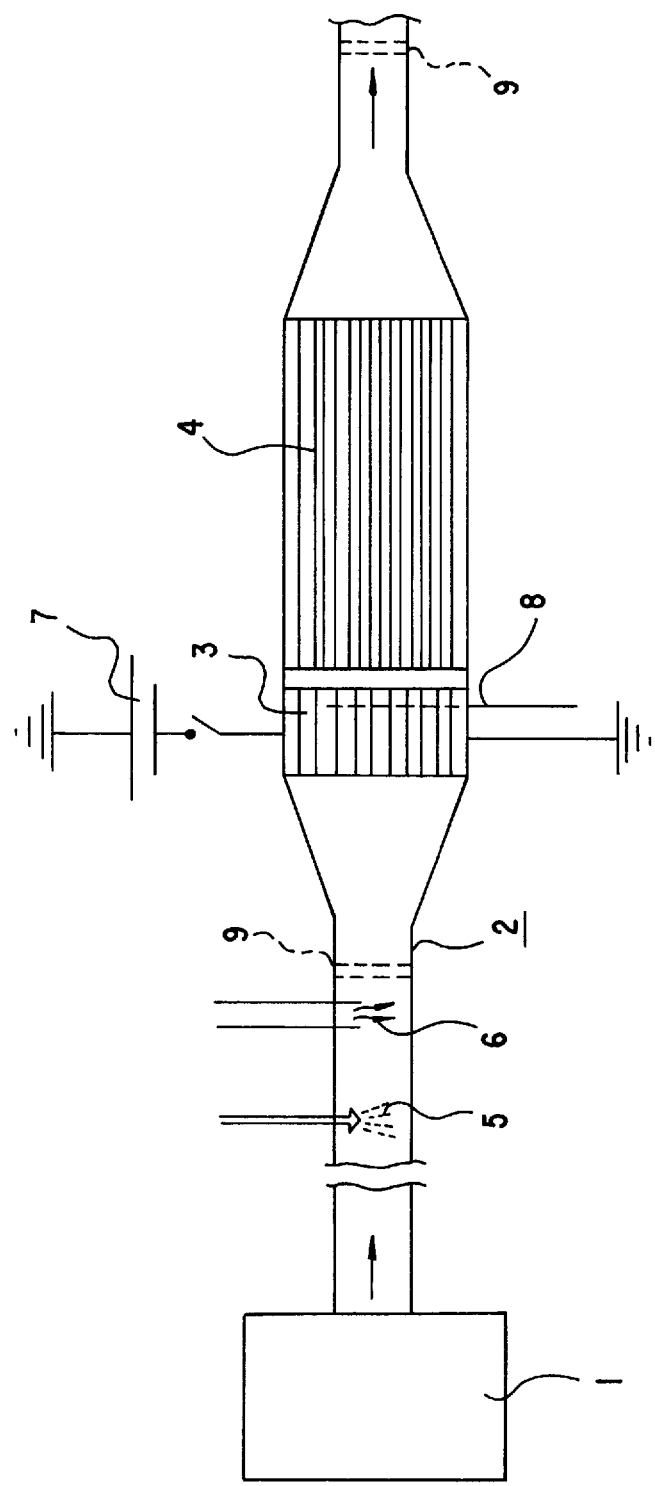

METHOD FOR REDUCING POLLUTANT EMISSIONS OF A DIESEL ENGINE WITH A DOWNSTREAM OXIDATION-TYPE CATALYTIC CONVERTER

CROSS-REFERENCE TO RELATED APPLICATION

This application is a Continuation of International Application Ser. No. PCT/EP94/03421, filed Oct. 17, 1994.

BACKGROUND OF THE INVENTION

FIELD OF THE INVENTION

The present invention relates to a method for reducing pollutant emissions from a Diesel engine with a downstream oxidation-type catalytic converter in cold starting, partial load and/or idling.

In the prior art there are various methods for reducing pollutant emissions of a Diesel engine. A distinction must be made between two different types of pollutants, namely gaseous pollutants and particles. In Diesel vehicles, soot particles have long been considered the most polluting component, and numerous devices have therefore been developed to remove such soot particles from the exhaust gas. For instance, U.S. Pat. No. 4,404,795 discloses a filter body that is gas-permeable but which traps soot particles. In order to avert stopping up of the filter from excessive accumulation of soot particles, the filter body is heated in its forward region from time to time by an electric heater. The heating is carried out enough to cause the accumulated layer of soot to ignite and burn off. In order to reinforce that method, additional air can be fed upstream of the filter body in that condition.

Another concept for reducing pollution from Diesel engines takes as its point of departure the fact that the hydrocarbons and the carbon monoxide contained in the Diesel exhaust gas must be oxidized to enable eliminating that component of pollutants. To that end, in Diesel engines similar oxidation-type catalytic converters to those in Otto engines are used, namely honeycomb bodies with many channels being permeable to the exhaust gas and having a catalytically active coating that promotes the oxidation of hydrocarbons and carbon monoxide. To some extent, soot particles flowing through the honeycomb body are also ignited and removed from the exhaust gas by being burned off, but that is not the primary purpose of such oxidation-type catalytic converters.

There are also concepts for reducing the nitrogen oxides in the exhaust gas that are produced at high temperatures. By way of example, that can be attained by an additional supply of hydrocarbons in the exhaust system. Combinations of those three possibilities described have been considered in principle, but technically and commercially they are difficult to realize.

In Otto engines it is known, for example from Published European Patent Application 0 412 103 B, to heat a forward portion of an exhaust gas catalytic converter before and/or after the start of the internal combustion engine, so that even during the cold-starting phase, when pollutant emissions are especially high, catalytic conversion can be attained. Numerous versions of electrically heatable honeycomb bodies that can be used as such forward portions have been described in the prior art.

Now that it has been possible to reduce soot expulsion from Diesel vehicles by structural provisions in the combustion chambers and by improved engine management, oxidation-type catalytic converters for reducing the unavoidable hydrocarbon components are a preferred concept for reducing pollutant emissions. Then, however, a previously little-noted and unsolved problem arises, namely that even oxidation-type catalytic converters, which in principle are not constructed as filters but instead have channels which are freely accessible or penetrable or through which a free flow can exist, nevertheless at the relatively low temperatures on their surface relatively quickly develop a deposited soot layer, which stops up the pores and reduces the catalytically active surface area or even entirely covers it. As a consequence, an oxidation-type catalytic converter with that kind of thin soot layer is practically no longer able to develop catalytic activity.

While a catalytic converter without soot deposition begins its catalytic activity at approximately 300° to 350° C., the soot layer still remains entirely unchanged at that temperature. The soot layer does not begin to burn off until approximately 600° C. As a consequence, an oxidation-type catalytic converter, once it has sooted up, does not become active even when it reaches a temperature of over 350° C. Since in Diesel vehicles such operating states as cold starting, partial load and/or idling, occur most frequently when the exhaust gas temperatures in the region of the catalytic converter are markedly below 600° C., it is precisely in those phases that it is impossible to assure the functioning of an oxidation-type catalytic converter.

SUMMARY OF THE INVENTION

It is accordingly an object of the invention to provide a method for reducing pollutant emissions from a Diesel engine with a downstream oxidation-type catalytic converter in cold starting, partial load and/or idling, which overcomes the hereinafore-mentioned disadvantages of the heretofore-known methods of this general type and which assures early catalytic conversion.

With the foregoing and other objects in view there is provided, in accordance with the invention, a method for reducing pollutant emissions, during at least one of cold starting, partial load and idling, from a Diesel engine having a downstream oxidation-type catalytic converter in its exhaust system with freely penetrable channels and an inflow side having at least one electrically heatable portion, which comprises heating the electrically heatable portion before and/or after starting of the Diesel engine to a temperature at which deposited soot ignites.

The electrically heatable portion may be a small, separate honeycomb body or a portion that is integrated with a larger honeycomb body. In general, this electrically heatable portion will have an axial length of from 10 to 50 mm, a diameter of between half the diameter and the entire diameter of the oxidation-type catalytic converter, and approximately 50 to 200 cpsi (cells per square inch). Its electrical power consumption may be between 500 and 2000 watts, for instance, but lesser or greater values are also possible.

In accordance with another feature of the invention, the oxidation-type catalytic converter has two or more electrically heatable portions disposed axially one behind the other, which can be heated in succession, so that a maximum electrical power is not exceeded yet nevertheless the entire catalytic converter can be incrementally freed of soot on its surface. Suitable honeycomb body configurations for this purpose are described, for instance, in Published European Patent Application 0 412 103 B.

Unlike the situation in known heating catalytic converters, which are intended above all to reduce pollutant emissions in cold starting of Otto engines, in the present invention it is important that the electrically heatable portion be heated as fast as possible to a temperature at which deposited soot ignites. This temperature is substantially higher than the temperature at which the catalytic conversion of hydrocarbons ensues at free catalytic surfaces.

Thus, in accordance with a further feature of the invention, the electrically heatable portion must in particular be heated to a temperature above about 600° C.

In accordance with an added feature of the invention, since pollutant emissions are to be reduced particularly in cold starting, the electrically heatable portion is heated quickly as much as possible, for instance in less than 20 seconds and preferably within less than 10 seconds.

As soon as the soot deposited on the electrically heatable portion ignites, an exothermic reaction ensues, but since in general the soot layer is very thin, in absolute terms this method does not bring about any major release of energy. It is therefore not possible to assure that the burnoff of the soot will propagate over the entire surface of the downstream honeycomb body, especially if the electrically heatable portion is not disposed separately.

However, since the entire surface is intended to be available for oxidation of hydrocarbons as soon as possible, in accordance with an additional feature of the invention, additional fuel and/or air is fed into the exhaust system of the Diesel engine, in order to convert them at the already very hot electrically heatable portion and with the thus-produced absolutely very hot exothermic energy to burn all the soot off from the surface of the downstream honeycomb body. If the Diesel engine is operated at that moment with an air excess, then it suffices to inject additional fuel. In other cases, additional air should be injected. If the soot layers are thick or if exhaust gas has otherwise been enriched with fuel, then merely supplying air can suffice.

In accordance with yet another feature of the invention, by measuring or deriving the pressure drop across the oxidation-type catalytic converter from other measured variables, a conclusion can possibly be drawn as to the necessity of heating or of delivering fuel or air.

The choice of heating strategy offers a number of possibilities in Diesel engines. In accordance with yet a further feature of the invention, in Diesel engines with preglowing, the electrically heatable portion can already be heated during the preglowing of the Diesel engine, as long as sufficient electrical energy for the purpose is available. If the supply of energy is limited because it is drawn from the vehicle battery, it can be more favorable not to begin the electric heating until immediately after starting of the Diesel engine, when additional energy from the generator is available. The heating can then be carried out much faster, with a higher current.

In accordance with yet an added feature of the invention, in order to provide open-loop or closed-loop control of the entire method it is especially advantageous to measure the temperature in or near the electrically heatable portion, and from the measured values to determine the end of heating and/or the beginning and ending of an additional injection of fuel and/or air. A temperature sensor that is integrated with or secured to the outside of the heatable portion can take on this task. It can be ascertained from the course of the temperature curve measured at this temperature sensor, whether or not the catalytic conversion of hydrocarbons already ensues at 350° C. In that case, no interfering soot layer is present, and further heating of the oxidation-type catalytic converter is unnecessary. If the reaction does not ensue at this temperature, then the heatable portion must be re-heated. An abrupt increase in the temperature must then be ascertainable at approximately 600° C., if the soot layer is beginning to burn off.

The delivery of additional fuel and/or air can then be controlled with such a signal. Evaluating the results of temperature measurement also makes it possible to draw conclusions about the functioning of at least the electrically heatable portion and its catalytically active coating.

Naturally, the present invention can be combined with other methods and apparatuses for reducing pollutant emissions in Diesel engines, especially those with soot filters. The energy generated by an exothermic reaction in the oxidation-type catalytic converter can, for instance, be utilized to ignite a soot layer in a downstream soot filter. An oxidation-type catalytic converter downstream of a soot filter can also help according to the invention so that the pollutants that might possibly still occur with periodic burnoff of the soot filter can be catalytically converted in almost their entirety.

Other features which are considered as characteristic for the invention are set forth in the appended claims.

Although the invention is illustrated and described herein as embodied in a method for reducing pollutant emissions from a Diesel engine with a downstream oxidation-type catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The FIGURE of the drawing is a fragmentary, diagrammatic, elevational view of an engine, exhaust gas system and oxidation-type catalytic converter used to describe an exemplary embodiment of the invention.

DESCRIPTION OF THE PREFERRED EMBODIMENTS

Referring now in detail to the single figure of the drawing, it is seen that exhaust gases from a Diesel engine 1 enter an exhaust system 2, which has an oxidation-type catalytic converter 4 with an electrically heatable portion or partial region 3 on the inflow side. The electrically heatable portion may be constructed like known heating catalytic converters for Otto engines and is supplied from a current source 7 with an electrical current, for instance of 50 to 200 amperes. A temperature sensor 8 measures the temperature in or on the electrically heatable portion 3, thus enabling purposeful regulation and monitoring of the method. In principle, however, the method can also be performed with purely timing control without a temperature sensor. A device for injecting fuel 5 or a device for supplying additional air 6 may be provided between the Diesel engine 1 and the heatable portion 3, so that after the heating of the electrically heatable portion 3 an exothermic reaction is brought about there between fuel and air, with which the entire oxidation-type catalytic converter 4 is burned free of soot. In this burnoff, the oxidation-type catalytic converter very rapidly attains a temperature that is already far above the temperature necessary for the catalytic oxidation, and therefore immediately after that the entire effectiveness for oxidizing hydrocarbons is available. A soot filter 9 may be disposed upstream or downstream of the oxidation-type catalytic converter 4.

The full catalytic action of the oxidation-type catalytic converter can already be available 10 or 20 seconds after starting of the Diesel engine through the use of the method of the invention. After that, only exhaust gases from which pollution has been removed are fed to the environment, even if the operating conditions of the Diesel engine in cold starting, partial load and/or idling would not intrinsically assure a sufficiently high temperature of the oxidation-type catalytic converter.

I claim:

1. A method for reducing pollutant emissions, during at least one of cold starting, partial load and idling, from exhaust gas of a Diesel engine having a downstream oxidation-type catalytic converter with freely penetrable channels and an inflow side having at least one electrically heatable portion, which comprises:

heating the electrically heatable portion to a temperature at which deposited soot ignites while the exhaust gas flows through the oxidation-type catalytic converter.

2. The method according to claim 1, which comprises initializing the heating step before starting of the Diesel engine.

3. The method according to claim 1, which comprises carrying out the heating step after starting of the Diesel engine.

4. The method according to claim 1, which comprises carrying out the heating step before and after starting of the Diesel engine.

5. The method according to claim 1, which comprises heating the electrically heatable portion to a temperature above approximately 600° C.

6. The method according to claim 1, which comprises heating the electrically heatable portion within less than 20 seconds.

7. The method according to claim 1, which comprises heating the electrically heatable portion within less than 10 seconds.

8. The method according to claim 1, which comprises feeding at least one of additional fuel and additional air into an exhaust system of the Diesel engine no earlier than upon attainment of a temperature in the electrically heatable portion at which deposited soot ignites, for additionally burning off soot from surfaces of the oxidation-type catalytic converter disposed farther downstream by an exothermic reaction.

9. The method according to claim 1, which comprises heating the electrically heatable portion during a preglow process of the Diesel engine.

10. The method according to claim 1, which comprises heating the electrically heatable portion immediately after starting of the Diesel engine.

11. The method according to claim 1, which comprises successively electrically heating a plurality of electrically heatable portions of the oxidation-type catalytic converter disposed one after the other in a flow direction.

12. The method according to claim 1, which comprises measuring temperature values in or near the electrically heatable portion, and determining an end of the heating from the measured values.

13. The method according to claim 1, which comprises measuring temperature values in or near the electrically heatable portion, and determining at least one of a beginning and an end of an additional injection of at least one of fuel and air, from the measured values.

14. The method according to claim 1, which comprises directly determining a pressure loss over the oxidation-type catalytic converter, and deriving a necessity of at least one of an additional heating and an additional delivery of fuel or air, from the pressure loss.

15. The method according to claim 1, which comprises indirectly determining a pressure loss over the oxidation-type catalytic converter, and deriving a necessity of at least one of an additional heating and an additional delivery of fuel or air, from the pressure loss.

16. The method according to claim 1, which comprises connecting a soot filter in series with the oxidation-type catalytic converter.

17. The method according to claim 16, which comprises connecting the soot filter downstream of the oxidation-type catalytic converter.

* * * * *